PICKUP ARM

Filed Feb. 24, 1965 2 Sheets-Sheet 1

INVENTOR

ADRIEN ZAHNER

BY Irwin S. Thompson

ATTY.

Feb. 20, 1968 A. ZAHNER 3,369,816

PICKUP ARM

Filed Feb. 24, 1965 2 Sheets-Sheet 2

INVENTOR

ADRIEN ZAHNER

By Irwin S. Thompson

ATTY.

United States Patent Office 3,369,816
Patented Feb. 20, 1968

3,369,816
PICKUP ARM

Adrien Zahner, Yverdon, Switzerland, assignor to Paillard S.A., Sainte-Croix, Switzerland, a corporation of Switzerland Filed Feb. 24, 1965, Ser. No. 434,989
Claims priority, application Switzerland, Mar. 10, 1964, 3,098/64
4 Claims. (Cl. 274—24)

ABSTRACT OF THE DISCLOSURE

A turntable pickup arm has a head that carries a pickup cell. The portion of the head that carries the pickup cell is mounted for sliding movement lengthwise of the arm and pivotal movement about a horizontal axis perpendicular to the vertical plane of symmetry of the cell, the tip of the needle being disposed in that vertical plane of symmetry.

The object of the present invention is an improvement designed to increase the possibilities of adjusting a pick-up arm, for example the arm described in Swiss Patent No. 368,636.

The importance has long been known for a pick-up arm to maintain the needle of the pick-up cell in a vertical plane tangent to the groove at the point of contact of the tip of the reading needle with said groove. For an arm having a fixed length and pivoting about a vertical axis $y$, this condition is only realized for two radii during the playing of a record. Outside these two definite radii, the vertical plane containing the needle forms a certain angle with the vertical plane tangent to the groove at the point of contact with the tip of the reading needle. This angle is called "tracing error in the horizontal plane."

To this tracing error corresponds a form of harmonic distortion in the reproduction of the modulation recorded on the record. Thus manufacturers of pick-up arms attempt through appropriate geometry to reduce this tracing error to a minimum. For a definite arm, the best conditions are produced when the distance between the vertical pivoting axis $y$ and the tip of the reading needle has a well determined value.

In an arm designed to permit the use of a large number of pick-up cells of various models, in which the position of the reproducing needle tip relative to the attachment device for the cell in the arm may vary to a fairly great extent, it is necessary to provide means for adjusting the position of this reproducing needle tip. Generally, the cell is mounted on a small plate which may slide longitudinally in the head of the pick-up arm, permitting to bring the reproducing needle tip to the most favorable distance from the vertical pivoting axis and thus produce the minimum tracing error.

In stereophonic records the information recorded in the groove corresponds to a modulation in the horizontal plane of the record and to a modulation in the vertical plane. Recent experiments have shown that a tracing error in the vertical plane, similar in its effects to the tracing error in the horizontal plane, could arise. During engraving, the upward movements of the engraving tool are not generally effected perpendicularly to the record, but along a straight line inclined relative to the vertical. If the reproducing needle tip, in the reproduction of a recording, does not move along the same straight line, a tracing error occurs.

A standardization which is under way tends to have record manufacturers adopt a uniform vertical engraving angle of 15°. But the pick-up cells at present in use have an upward movement angle of the reproducing needle tip which may vary between 0° and 30° according to the models. If it is desired to eliminate the tracing error in the vertical plane for the greatest number of these cells, it is therefore necessary to provide adjusting means permitting of bringing the straight line along which the reproducing needle tip is displaced during its upward movement of 15° relative to the vertical. The only way of doing this is to cause the whole cell to pivot in the vertical plane which is tangent to the groove.

The present invention has for its object a pick-up arm comprising at its free end a head adapted to receive a pick-up cell, characterized by the fact that this head comprises a device for adjusting the vertical reproducing angle, that is, the angle formed by a tangent to the trajectory of the reproducing needle tip in its vertical movements with respect to a straight line perpendicular to the plane of the record.

The accompanying drawing shows diagrammatically and by way of example two embodiments of the pick-up arm according to the invention.

Figure 2:
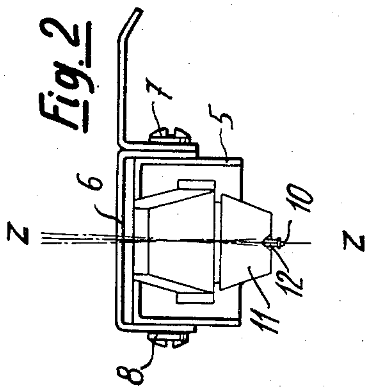
FIG. 2 is a partial end view of a second embodiment.
Figure 3:
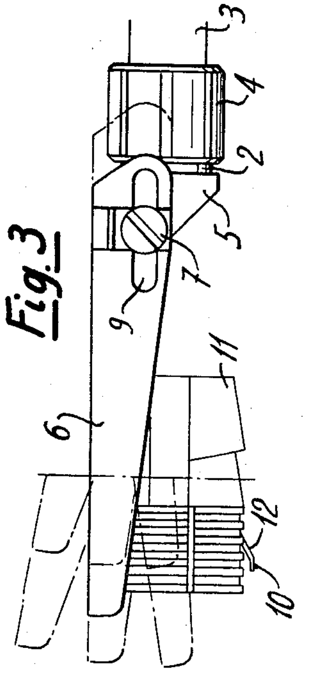
FIG. 3 is a partial view in elevation of the first embodiment.
Figure 1:
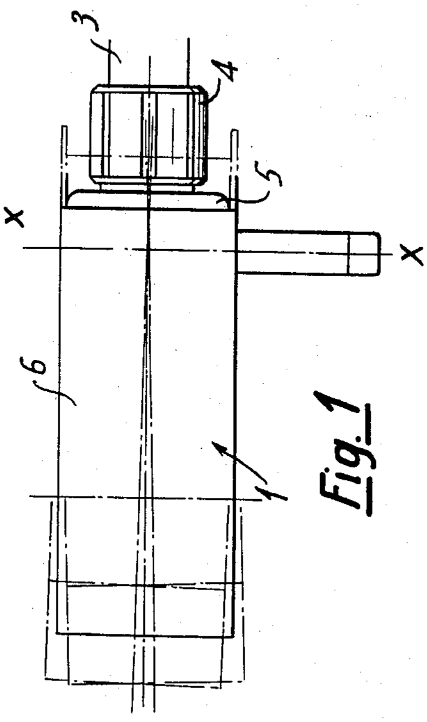
FIG. 1 is a partial view of a first embodiment.

In the embodiments shown the head 1 is removable and adapted to be fixed to a pick-up arm of the type described in the above cited patent. This attachment is obtained by means of a male plug 2 secured to the head 1 and a corresponding female plug which is located at the free end 3 of the arm. A nut 4 permits of maintaining the two plugs firmly in contact.

The plug 2 is integral with a case 5 on which is mounted a U-shaped element 6 by means of a hinge which permits it to slide in the longitudinal direction of the end portion of the arm 3 and to pivot around an axis $x$ perpendicular to the vertical symmetry plane $z$ of the pick-up cell 11, which plane contains the reproducing needle tip 10 and its oscillating armature 12.

This hinge comprises two screws 7 and 8 fixed to the case 5 along the axis $x$. They pass through two elongated slots 9 made on the two sides of the U-shaped element 6. It is therefore sufficient to loosen slightly the two screws so that it may be possible to cause this element to slide and pivot relative to the case 5 which is integral with the arm. It is thus possible to adjust simultaneously the distance between the vertical pivoting axis $x$ of the arm and the reproducing needle tip 10 of a pick-up cell 11 secured by known and standardized means at the head 6, and the vertical reproducing angle, angle included between the straight line of vertical movement (in height) of this tip with respect to the vertical, that is to say with respect to a line perpendicular to the face of the record.

It is obvious that the two adjustments could be effected not by a single and same hinge as in the example described, but by means of two separate devices. The cell could be mounted in known manner on a small plate capable of sliding longitudinally on the element 6 while this element would merely pivot about the axis $x$. The solution shown has however the advantage of a minimum of elements and thus of a minimum weight, which is an important factor in the manufacture of a pick-up arm.

Figure 4:
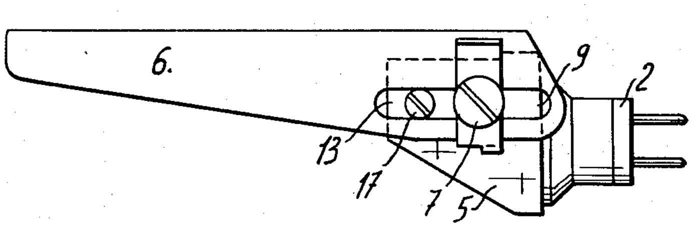
FIG. 4 is a side elevational view of a second embodiment.
Figure 5:
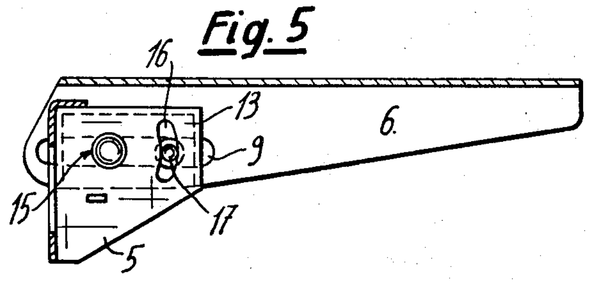
FIG. 5 is a longitudinal sectional view thereof, certain parts being omitted.
Figure 6:
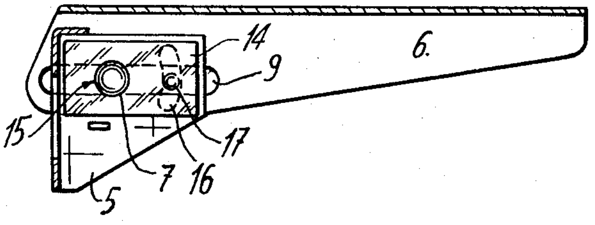
FIG. 6 is a longitudinal sectional view.

However in certain cases it is necessary, to obtain greater accuracy in the positioning of the pick-up cell, to be able to effect the adjustment in the longitudinal direction of the pick-up arm independently of the angular adjustment of this pick-up cell. This is effected in the second embodiment shown in FIGS. 4 to 6 in which the members identical or similar to those already described with reference to the first embodiment bear the same reference numbers.

In this second embodiment the pick-up cell is mounted in a manner similar to the one described with reference to the first embodiment. In fact, the case 5 carrying the plug 2 is also secured to a U-shaped element 6 through the agency of a hinge.

This hinge comprises as in the first embodiment two screws 7 and 8 secured to the case 5 along the axis *x* and passing through two elongated holes 9 made on the two sides of the U-shaped element 6.

This hinge further comprises, on at least one of the sides of the U-shaped element 6, two small plates 13, 14 pivoted concentrically about the axis of the screw 7, the one directly on the body of this screw 7 and the other on a washer 15 integral with the case 5 and in which is screwed the screw 7. These small plates 13, 14 are situated on either side of the flange of the case which itself comprises a circular slot 16, concentric with the pivoting axis *x* of the case, and extending over an angular distance of 10 to 30°.

The position of this slot 16 is such that it is situated between the two small plates 13, 14. A screw 17 is screwed in the plate 14, situated inside the casing 5. This screw 17 passes through the slot 16 of the case 5, also passes through the plate 13. The head of this screw 17 bears on the plate 13 in tightened position and merges out of the U-shaped element 6 by the slot 9 made therein.

When the screws 7, 8 and 17 are loosened, it is possible to move the U-shape element 6, and thus the cell 11, linearly and angularly relative to the case 5 and thus relative to the pick-up arm.

The user then adjusts the angular position of the pick-up cell, then tightens the screw 17 which wedges the case 5 between the plates 13, 14 and, the head of this screw 17 being engaged without clearance in the slot 9, fixes the angular position of this case relative to the U-shaped element 6. Then the user adjusts the position of the pick-up cell along the longitudinal axis of the element 6 and tightens the screws 7 and 8 thus securing the casing to the element 6.

In this manner, one may proceed independently with the angular adjustment of the cell and with its longitudinal adjustment.

The hinge about the axis *x* will preferably be effected so as to maintain a certain friction between the element 6 and the case 5 when loosening the screws 7 and 8, either by elastic pressure of the sides of element 6 against the sides of the case 5, or by the interposition of spring washers, or by any other known means.

Finally the head could merely comprise the device permitting of adjusting the inclination of the straight line along which the reproducing needle tip is displaced during its upward movements, the adjustment of the distance between the reproducing needle tip and the vertical pivoting axis of the arm, if it exists, being effected by movements of the base itself of the arm, carrying its pivots, relative to the frame of the turntable.

I claim:

1. A turntable pick-up arm having a free end, a head carried by said free end of the arm, a pick-up cell, said head having a portion carrying the pick-up cell, means mounting said cell-carrying portion of the head for sliding movement lengthwise of the arm and for pivotal movement about an axis perpendicular to the vertical plane of symmetry of the pick-up cell, and a reproducing needle whose tip lies in said vertical plane of symmetry of the cell.

2. A turntable pick-up arm as claimed in claim 1, said mounting means comprising two screws disposed along said pivotal axis, said cell-carrying portion of the head comprising a U-shaped member, said head comprising a case fixed on said free end of the pick-up arm and connected to said U-shaped member by said screws.

3. A turntable pick-up arm as claimed in claim 2, said U-shaped member having longitudinal slots therein through which said screws pass.

4. Turntable pick-up arm as claimed in claim 3, a portion of said case having an arcuate slot therethrough concentric with said screws, and a clamping member extending through said arcuate slot and through one of said longitudinal slots for selectively clamping said case and said U-shaped member together in any of a plurality of positions of adjustment.

References Cited

UNITED STATES PATENTS

| | | | |
|---|---|---|---|
| 2,354,558 | 7/1944 | Thompson | 274—24 |
| 3,273,897 | 9/1966 | Farrington | 274—24 |

LEONARD FORMAN, *Primary Examiner.*

F. J. D'AMBROSIO, *Assistant Examiner.*